Sept. 2, 1952 M. PIERLOT 2,608,781
OTTER BOARD
Filed April 22, 1949 3 Sheets-Sheet 1

MAURICE PIERLOT
INVENTOR.

BY *Hugh A. Kirk*

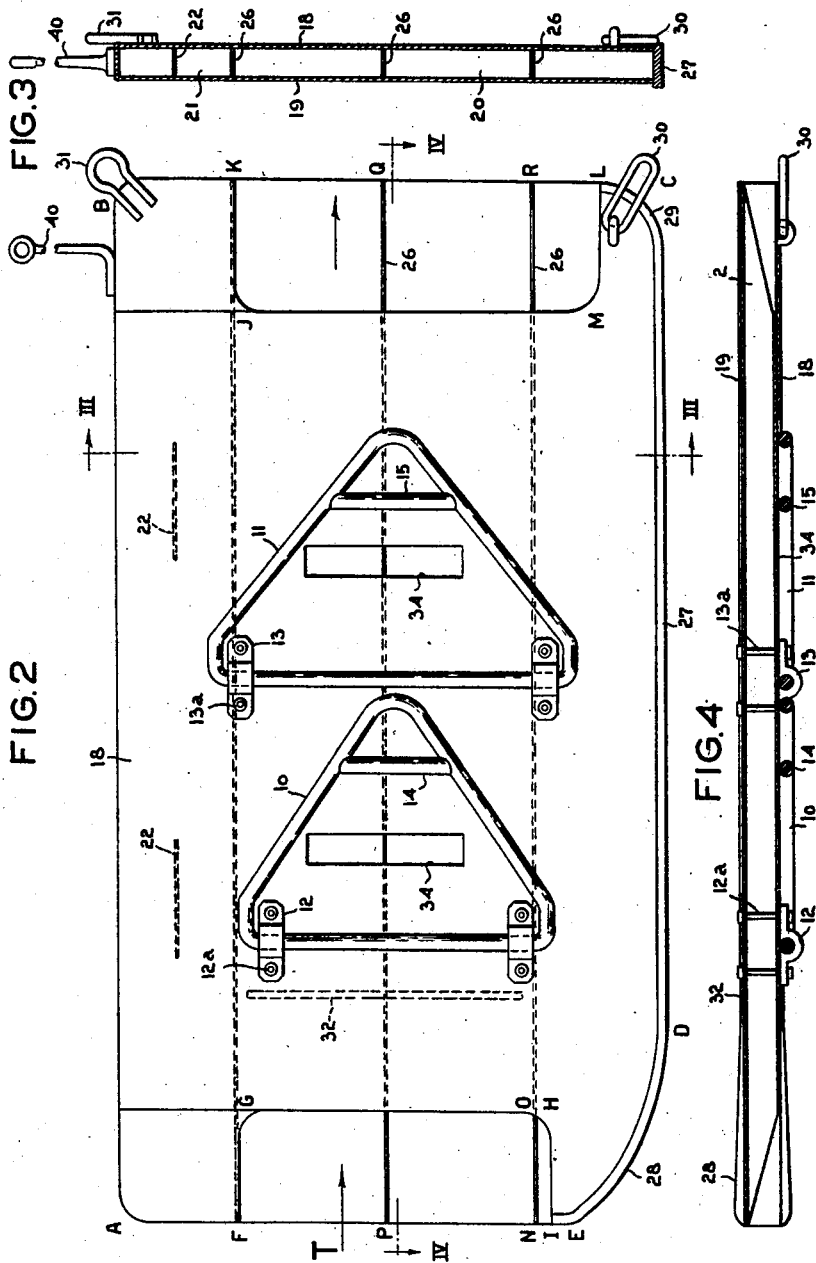

Sept. 2, 1952 M. PIERLOT 2,608,781
OTTER BOARD
Filed April 22, 1949 3 Sheets-Sheet 3
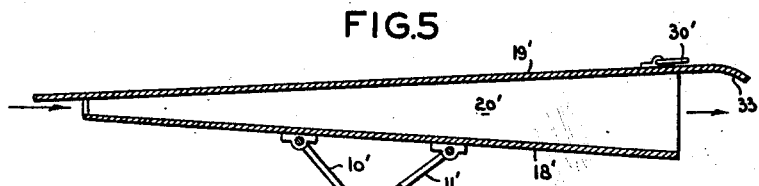
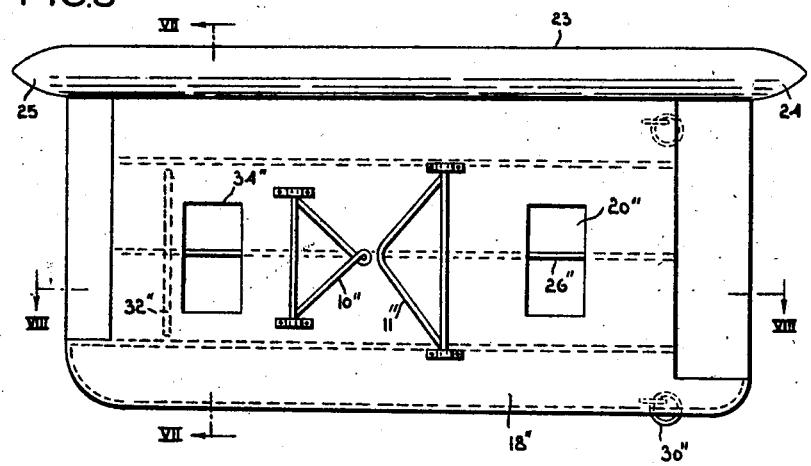
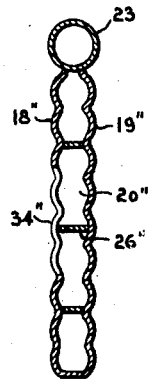
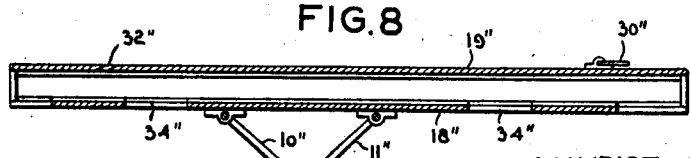
MAURICE PIERLOT
*INVENTOR.*
BY *Hugh A. Kirk*

Patented Sept. 2, 1952

2,608,781

UNITED STATES PATENT OFFICE 2,608,781

OTTER BOARD

Maurice Pierlot, Heist-aan-Zee, Belgium

Application April 22, 1949, Serial No. 88,996
In Belgium April 28, 1948

27 Claims. (Cl. 43—9)

This invention relates to an otter or trawl board. More particularly, it deals with hollow otter boards of improved construction which are dragged in pairs through the water by a fishing vessel, such as a trawler, for maintaining a trawl net open for the catching of fish.

Previously, heavy reinforced wooden boards have been used for this purpose which act as rudders or vanes on each side of a trawl net to keep the mouth of such a net open, but such boards being made out of wood are subject to damage, rotting, deterioration, and soon become water soaked thereby decreasing their buoyancy and stability when in use in the water. Other types of boards and means have been suggested to avoid one or more of these disadvantages, but such means usually require a change in the superstructure of the vessel for their operation, or have other disadvantages, and accordingly are not commonly used.

It is an object of this invention to produce an otter board which has been proved to be more economical, efficient and effective than previously known wooden otter boards and similar devices, for keeping the mouth of a trawl net open, and which avoids all of the disadvantages above mentioned.

Another object is to produce an otter board of better water cutting power, more stability, less drag and less thickness than the known wooden otter boards.

Another object is to produce such an otter board which, compared to the known wooden otter boards, is more economical on fuel, keeps the mouth of a trawl net open wider and higher for catching more and faster types of fish, is of lighter weight and still does not have any greater outside dimensions, nor a substantially different shape than said known type of wooden otter boards, nor requires a special or different structure on a vessel for its proper operation.

Another object is to produce such an otter board capable of maintaining its stability in rough seas and always remaining upright while in the water.

In accordance with this invention, the otter board comprises two thin side plates, preferably substantially rectangular in shape, which are maintained a fixed distance apart by means along their top and bottom edges to provide a passageway between them through which water may easily and quickly stream or flow without any obstruction. Along the top edge of the pair of plates forming such an otter board, there is preferably provided a buoyancy chamber, such as a watertight compartment filled with air, to aid in maintaining the board in an upright position at all times while it is in the water; the size of the chamber depending upon the dimensions and weight of the board. Along the bottom edge of the board there may be placed a ski-shaped runner, skate or shoe, with an upturned front end to slide easily over the bottom of the sea, as well as to prevent sand, mud and stones, from the bottom of the sea along which the board is dragged, from clogging or blocking the passageway or space between the two side plates of the board. This shoe may be weighted to aid in keeping the board upright at all times while in the water.

The width of the space between the two side plates which form the board has a definite ratio to the length of the board and ranges from one fortieth to one twentieth the length of the board, or from 25 to 50, and preferably 30 and 40 millimeters in width to each meter of length of the board in the direction in which it is dragged through the water. Also this space or channel between the plates may be gradually increased in width in the direction in which the board is dragged, if desired. The inner plate facing the mouth of the net is from one eighth to one twelfth, and preferably about one tenth of the length of the board shorter than the other or outer plate, so that the outer plate overlaps the inner plate along both its shorter or vertical sides, preferably more along the back than the front side. The rear or greater overlapping edge of the outer plate may also be bent, as desired, to serve as a rudder for directing the board. These plates may be provided with one or more vertical slots or openings to decrease the drag resistance of the board and increase the flow of the water through the space between the plates, such as providing in the outer plate a slot near the front edge to break the eddy currents formed behind the board, and also in longer boards one or more apertures in the inner plate to insure a full flow of water through the space between the two plates. The plates also may be corrugated longitudinally in the direction of their motion through the water so that rigid lighter weight boards may be produced. The plates may be made out of any sheet material of from one to eight millimeters, and preferably from two to six millimeters thickness of a corrosion free metal or alloy, such as sheet iron, sheet steel, aluminum, or the like, or out of a plastic material.

At the bottom and at or above the top rear corners of the board there may be provided means for fastening the head or top and ground or bottom lines or ropes to the opening or mouth of the trawl net; and mounted on the inner plate of the board there may be provided pivoted brackets to which the tow lines or ropes to the towing vessel are connected. These brackets may be arranged to place the boards, when being pulled through the water, to cut the water at a given angle or angles, between about 30° and 50°, preferably about 40° to the direction of movement of the boards and these brackets may be also arranged so as to change this angle slightly by connecting the tow lines in different ways to said brackets.

The above mentioned and other features and objects of this invention and the manner of attaining them will become more apparent and the invention will be best understood by reference to the following description of an embodiment of the invention taken in conjunction with the accompanying drawings, wherein:

Fig. 2 is a side elevation of one embodiment of an otter board according to this invention;

Fig. 3 is a vertical sectional view taken along line III—III of Fig. 2;

Fig. 4 is a longitudinal sectional view taken along line IV—IV of Fig. 2;

Fig. 5 is a longitudinal sectional view similar to Fig. 4 of an otter board according to another embodiment of this invention in which the chamber between the sides is of varying width;

Fig. 6 is a side elevation view of an otter board according to still another embodiment of this invention;

Fig. 7 is a vertical sectional view taken along line VII—VII in Fig. 6;

Fig. 8 is a longitudinal sectional view taken along line VIII—VIII in Fig. 6;

Similarly functioning parts in each of the different modifications shown in the drawings are given the same reference numbers with correspondingly different primes according to the modification to which they refer.

Figure 1:
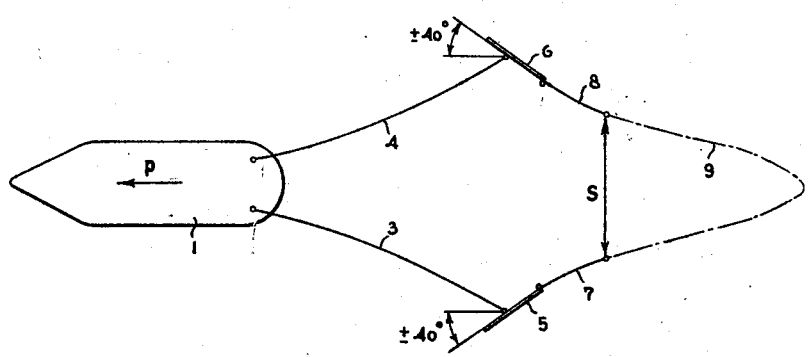
Fig. 1 is a schematic plan view of a trawler, to the back of which is attached a trawl net, the mouth of which net is kept open by means of otter boards.

Referring to Fig. 1, there is schematically shown a trawler or fishing vessel 1 moving in the direction of the arrow p from the stern of which vessel are two tow lines 3 and 4 connected to brackets on the inner side of each of the pair of otter boards 5 and 6, respectively. Connected to the rear of each board are lead lines 7 and 8 from the opposite sides of the opening or mouth of the trawl or fishing net 9 which is kept open the distance s by the rudder action of the two otter boards 5 and 6 cutting through the water when in motion. The boards and net may either be dragged along a smooth bottom of the sea, or above the bottom, depending upon the type of fish to be caught in the net. This is the conventional way of using otter boards both of the known wooden type and of the type according to this invention.

In one embodiment of the improved otter board of this invention, as shown in Figs. 2, 3 and 4, the substantially rectangular side plates 18 and 19 are uniformly spaced and reinforced by longitudinal strips 26. A watertight chamber of air 21 is shown along the top edge of the board between the plates, which may be reinforced internally by transverse pieces 22. This chamber should be of such a size to provide a buoyancy of preferably at least about 10% of the total weight of the board to afford good stability of the board and insure its upright position at all times while in the water. A ski-shaped runner, skate, or shoe 27 connects the plates along the bottom, which shoe preferably is curved upwardly from one-fifth to one-seventh of the way up the front edge of the board at 28, and which may be also curved up a little at 29 at the rear of the board. This shoe 27 is preferably of heavier and thicker material than the plates 18 and 19 to withstand wear, and also may be wider than the thickness of the board at the plates, particularly at the front and more turned up end of the shoe. This shoe should weigh at least about one-tenth of that of the whole weight of the board, which in cooperation with the buoyancy chamber 21 helps to keep the board upright and stable when in use.

The outer plate 19 of the board shown in Fig. 2 overlaps the inner plate 18 by the area FGHI at the front end of the board, and by the area JKLM at the rear end of the board, the latter being shown to be slightly greater in area than the former, to afford as free an exit as possible for the water passing through the channel 20 in the direction of the arrow T, so as to reduce the drag of the boards when they are pulled through the water. The total overlapping is between about one-eighth and one-twelfth, and preferably about one-tenth of the length of the board. This drag may also be reduced by the employment, near the front edge of the outer plate 19, of a narrow vertical slot 32 having substantially the same height as the channel of the water flowing through the space 20, defined by the members 18, 19, 26 and 26 in Fig. 3 and preferably directed rearwardly from said channel. This slot 32 supplies water to the outside and back of the board to break the suction and eddy currents in the water formed behind the board which otherwise would cause considerable drag. Furthermore, particularly in long boards (that is those more than about 2 meters in length) additional apertures, such as 34, may be provided in the front or inner plate to increase and thereby aid the flow of the water through the channel 20.

This flow may also be increased, by gradually increasing the distance between the plates as shown in the embodiment of Fig. 5, comprising the longitudinally diverging plates 18' and 19' forming a wedge-shaped water channel 20' between them. This embodiment also shows the feature of bending the rear edge of the outer plate to deflect the water coming from the channel, which bend 33 acts as a rudder for the board and may be placed at any desired predetermined angle.

In the center of the board mounted on the inner or smaller of the two plates, 18, there are shown to be mounted brackets 10 and 11, which may be of triangular shape and pivoted against the plate 18 in U-shaped supports 12 and 13, respectively, which supports may be held to the board by bolts 12a and 13a which run through the whole thickness of the board traversing the passageway or space 20 between the plates 18 and 19, and thereby also aiding in holding the two plates together (see Fig. 4).

Figure 9:
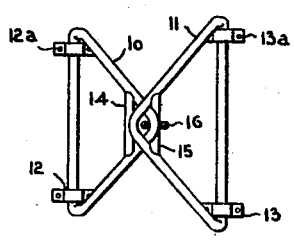
Fig. 9 shows one position for connecting a tow line to the brackets of an otter board of the type shown in Fig. 2.
Figure 11:
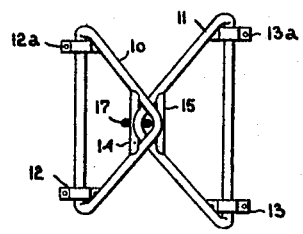
Fig. 11 shows another position for connecting the tow line to the brackets of an otter board of the type shown in Fig. 2.
Figure 10:
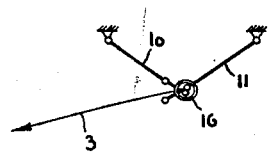
Fig. 10 is a schematic plan view of the connection shown in Fig. 9.
Figure 12:
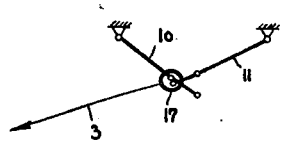
Fig. 12 is a schematic plan view of the connection shown in Fig. 11.

Each of the triangular brackets 10 and 11 may be provided with a bridging member 14 and 15, respectively, parallel to the base of the triangle of the bracket that is pivoted to the board, thereby forming a smaller triangular aperture through which the projecting apex of the other bracket may be inserted, so that a link or ring 16 or 17 (see Figs. 9 and 11, respectively) may be fastened around the end of one shackle and the bridge of the other to form either one of the two different fixed angular positions for the brackets (see Figs. 9 through 12) at which the board may be connected to the tow line for being dragged through the water. As shown in Figs. 10 and 12, these two different positions of the brackets permit an increase or decrease of from 5° to 10°, respectively, of the ±40° angle (see Fig. 1) at which the otter boards cut through the water. The connection chosen (Figs. 9 and 10 or Figs. 11 and 12) to effect a given angle depends upon many factors including the speed of the vessel, the opening of the net, and the type of fish to be caught. The same reference numerals are used in Figs. 6, 7 and 8 to identify members corresponding to those identified in Figs. 2, 3 and 4 except that double prime marks are used with the said reference numerals.

At the rear of the board there is provided loops or rings 30 and 31 at the top and bottom corners, respectively, to which the ground and head ropes to the top and bottom of the mouth of the trawl net are connected, namely lines 7 and 8 shown in Fig. 1. With the otter board of this invention there may be also provided an additional bracket 40, comprising a ring mounted on the end of an upstanding L-shaped member affixed to the rear top edge of the board, to which the head rope to the net may be fastened instead of to the loops 31, so as to open the mouth of the net to a greater height for catching more fish including those swimming above the bottom of the sea. The bracket 40 may extend to about half the height of the board above the net, if desired. Such a bracket 40 is only possible in the otter boards of this invention because of their increased stability, so that the pull of the head ropes on the brackets 40 does not tip the boards over thereby twisting said ropes.

Another embodiment of this invention is shown in Figs. 6, 7 and 8 which may comprise a lighter type board than those just described and which has longitudinally corrugated side plates 18″ and 19″ and a tubular buoyancy or air chamber 23 joining the top edges of said plates, which tube may be streamlined or pointed at its closed ends 24 and 25. With such a board, trawling may be made above the bottom of the sea, the depth of which may be determined by the size of the air chamber relative to the size and weight of the board. In this modification, other types of triangular brackets 10″ and 11″ are shown from those shown in Figs. 2, 4, 9 and 11, namely, brackets with the bridging members 14 and 15 eliminated.

The noncorrosive and nondeteriorating materials, such as sheet metal, from which the otter boards of this invention are constructed, may be bolted or riveted together, and if of metal preferably welded together along the edges of contact of the pieces of which they are constructed.

Actual comparative tests have shown the otter boards of the present invention to cut the water with less resistance or drag, and to spread the opening or mouth of the net to a greater degree than heretofore possible, thereby materially increasing the quantity of the fish caught. For example, for the same power or fuel consumption of a vessel dragging a trawl net with the otter boards of this invention as compared to the known solid wooden type boards, a greater speed may be employed so that round and faster swimming fish, such as for example cod, whiting, and herring may be caught. The passage of the water through the space between the side plates of the otter boards of this invention can be seen to produce a wake several meters behind the boards, which wake in effect acts as a water wall for the fish swimming between the two boards and directs them into the net. This wake also aids in keeping the otter boards spread apart a greater distance, thus opening the mouth of the net wider to catch more fish. The great stability of the otter boards of this invention also prevents them from being turned over in a rough or stormy sea which would tangle the tow and lead ropes so that the time previously lost in pulling in such tangled boards and net and returning them in right order, is now avoided. This stability is demonstrated by the even wear along the shoes of the otter boards of this invention, which are dragged along the bottom of the sea. This stability is caused by both the weighted bottom shoes and the top buoyancy chamber, as well as the velocity of the channelled sheet of water passing through the boards between the plates.

While there is described above the principles of this invention in connection with specific apparatus, it is to be clearly understood that this description is made only by way of example and not as a limitation to the scope of this invention.

What is claimed is:

1. A flat and thin otter board to be dragged through the water comprising: two side plates, and means to connect said plates at least along their top and bottom edges to provide an open ended channel between said plates through which water can freely flow, said channel having a mean width in relation to the length of said board in the direction it is dragged, which relation ranges from one to forty to two to forty.

2. The otter board of claim 1 wherein said relation ranges from three to one hundred to four to one hundred.

3. The otter board of claim 1 wherein said side plates are made of metal sheets having a thickness of from one to eight millimeters.

4. The otter board of claim 3 wherein said sheets have a thickness of from two to six millimeters.

5. A hollow otter board for being dragged at an angle through the water comprising: a substantially rectangular front plate, a substantially rectangular back plate, and means to connect said plates together at least along their top and bottom edges to provide an open ended channel between said plates through which water flows as the board is dragged through the water, the section of said back plate adjacent said channel being longer than the corresponding section of said front plate, said channel having a mean width perpendicularly between said plates in a ratio ranging from one to forty to two to forty to the length of said board.

6. The otter board of claim 5 wherein said plates are corrugated longitudinally in the direction in which they are dragged.

7. The hollow otter board of claim 5 wherein said connecting means includes longitudinal reinforcing strips completely bridging the space between said plates.

8. The hollow otter board of claim 5 wherein said back plate partially overlaps said front plate a distance of approximately one eighth to one twelfth of the length of said board.

9. The hollow otter board of claim 5 wherein said back plate partially overlaps said front plate at both ends of said board.

10. The otter board of claim 9 wherein the partial overlap at the front end of said board is less than that at the back end of said board.

11. The hollow otter board of claim 5 wherein said back plate contains a slot substantially the height of said channel to break the eddy currents in the water behind the board and thereby reduce the drag of the board when the board is being pulled at an angle through the water.

12. The hollow otter board of claim 5 wherein said front plate contains at least one aperture in its face to permit an increased amount of water to enter said channel between said plates when said board is being dragged through the water.

13. A hollow otter board for being dragged through the water at an angle comprising: two side plates of substantial rectangular shape, means to space said plates to provide an open ended channel between them through which water can freely flow unobstructed, said channel having a width in relation to the length of said board in the direction it is dragged, which relation ranges from one to forty to two to forty, and a buoyancy chamber along the top of said board.

14. The otter board of claim 13 wherein the buoyancy of said chamber is at least about 10% of the weight of said board.

15. The otter board of claim 13 wherein said buoyancy chamber comprises a streamlined closed end tube.

16. The otter board of claim 13 wherein said buoyancy chamber is mounted between said plates and comprises a part of said spacing means.

17. A hollow otter board for being dragged through the water at an angle comprising: two side plates of substantial rectangular shape having an open ended space between them through which water can freely flow unobstructed, said channel having a width in relation to the length of said board in the direction it is dragged, which relation ranges from one to forty to two to forty, and a ski-shaped shoe means along the bottom of said plates bridging the space between them.

18. The otter board of claim 17 wherein said shoe has a weight of at least about one tenth of the weight of the whole board.

19. The otter board of claim 17 wherein said shoe is turned up at both of its ends.

20. The otter board of claim 17 wherein said shoe is turned up at the front end of said board from one fifth to one seventh of the vertical height of the board.

21. The otter board of claim 17 wherein said shoe is wider than the outside distance between said plates, at least toward the front end of said shoe.

22. An otter board comprising two side wall members, a bottom member and a top member defining a box-like structure having open ends, partitions in spaced relation extending longitudinally of the wall members and between the top and bottom members, said partitions engaging the inner sides of said wall members for the full length thereof, one of the wall members having a portion thereof of less length than the corresponding portion of the other wall member, said wall members having at the upper edge thereof a buoyancy chamber, and means to connect said board to a net and towing means.

23. The otter board of claim 22 wherein the longer side of said plate at the rear of said channel includes a bent deflator acting as a rudder.

24. In an otter board having means to connect said board to a net and to a towing means, the improvement comprising an otter board having two side plates, a bottom strip and a top strip defining a box-like structure having open ends, spaced partitions extending substantially the length of said board from one of said side plates to the other and being parallel to said top and bottom strips, and one of said side plates having a section thereof less than the length of the adjacent section of the other said side plate, forming a channel in which one side is longer than the other and through which water may freely flow.

25. The otter board of claim 24 wherein said two side plates are parallel.

26. The otter board of claim 24 wherein said channel between said two side plates gradually increases in breadth in the direction in which said board is dragged through the water.

27. The otter board of claim 24 having a buoyancy chamber along the top of said board, above said section having one side wall of less length than the other.

MAURICE PIERLOT.

REFERENCES CITED

The following references are of record in the file of this patent:

UNITED STATES PATENTS

| Number | Name | Date |
|---|---|---|
| 661,100 | Delanoy | Nov. 6, 1900 |
| 809,965 | Lystne | Jan. 16, 1906 |
| 2,548,915 | Sorensen | Apr. 17, 1951 |

FOREIGN PATENTS

| Number | Country | Date |
|---|---|---|
| 13,056 | Australia | May 1, 1928 |
| 216,418 | Great Britain | May 29, 1924 |
| 265,820 | Great Britain | Feb. 17, 1927 |
| 275,254 | Great Britain | Apr. 19, 1928 |